United States Patent Office 3,111,105
Patented Nov. 19, 1963

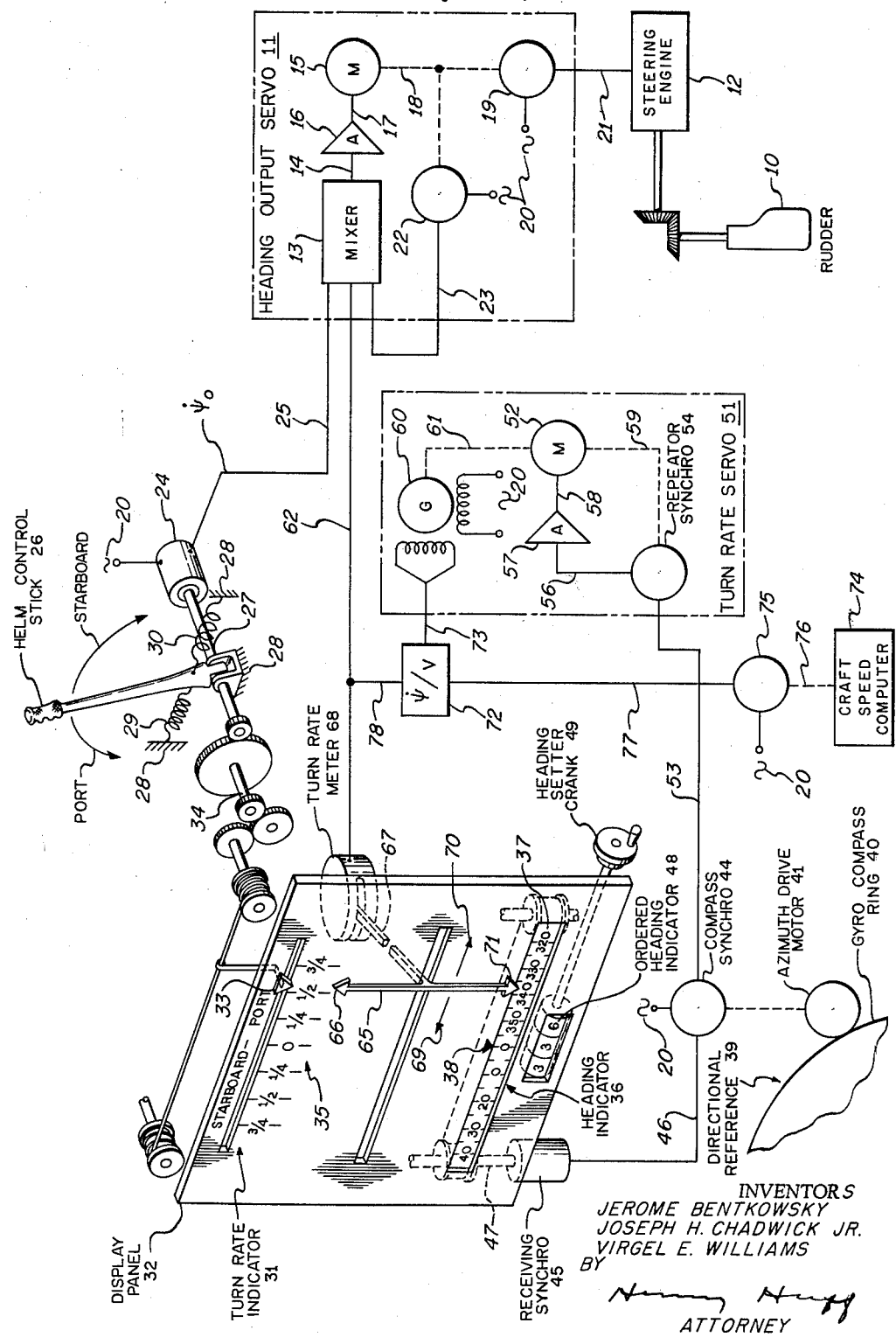

3,111,105
TURN RATE CONTROL SYSTEM
Jerome Bentkowsky, Charlottesville, Va., Joseph H. Chadwick, Jr., Amityville, N.Y., and Virgel E. Williams, Charlottesville, Va., assignors to Sperry Rand Corporation, Great Neck, N.Y., a corporation of Delaware
Filed Apr. 17, 1962, Ser. No. 188,115
16 Claims. (Cl. 114—144)

This invention relates to a turn rate control system for navigable craft. More particularly, the invention converns a manually operated steering system for craft of the marine type having rudders where no limits are imposed on the travel of the rudder during turns.

In the improved system, the turn order input means to the servo means connected to operate the rudder determines the turn rate of the craft rather than the rudder angle. Turn orders are derived from an order synchro that is controlled by a manually movable member in the form of a helm control stick. The movement of the stick from a null position is observed by an operating helmsman on a turn rate indicator included on a display panel. The stick under control of the helmsman is operatively connected to the movable part of the turn rate indicator to designate the ordered turn rate. The stick of the turn order input means is also operatively connected to the order synchro to provide an output depending on its movement from a null position.

The improved steering system controls the turn rate of the craft by the provision of an input to the rudder servo means that is in opposition to the output of the synchro of the turn order input means. The means opposing the turn order means includes means providing an output depending on the actual rate of turn of the craft. The turning maneuver of the craft about its yaw axis is observed by the helmsman on a heading indicator provided on the display panel of the system with relatively movable scale and pointer parts. Where for instance the scale of the heading indicator is a compass card and the pointer is a fixed lubber line or index on the panel, the card appears to move with relation to the line as the craft turns from its initial heading to the ordered heading.

The azimuth direction in a turn at which it is necessary for the helmsman to return the stick or movable member to its null position to check the rudder so that the craft moves to the ordered heading smoothly is indicated on the display panel by the relative displacement between the index of the heading indicator and a movable element with a part readable on the compass card of the heading indicator. Another part of the movable element of the display panel is read by the helmsman with relation to the parts of the turn rate indicator of the system to compare the ordered turn rate to the actual turn rate and enable the system to utilize the full range of the helm stick at all speeds of the craft. The operation of the movable element of the panel common to the heading and turn indicators is dependent on the rate that the craft is actually turning divided by its actual speed. This ratio is equivalent to the reciprocal of the turning radius of the craft and is approximately proportional to the actual turn rate of the craft divided by the maximum turn rate obtainable for a particular craft speed. This enables the system to operate to turn the craft at a rate below its maximum turn rate for a particular craft speed and accordingly obviate the need of rudder angle limits. The heading error or turn pull-out heading observed on the display panel of the system with relation to the scale of the heading indicator is the angular difference between the ordered heading and the actual heading of the craft at which it is necessary to null the order input to the rudder. This error is approximately proportional to the reciprocal of the turn radius of the craft at its operating speed as provided as an input to operate the movable element common to the heading and turn indicators of the display panel. As the system enables the helmsman to observe the exact turn cut-off heading point, heading changes are effected accurately and smoothly through the single initiating and single return movements of the stick or manually movable member.

The primary object of the present invention is to provide a system for steering a craft that only requires two operations of the helmsman to complete an ordered turn accurately and smoothly without overshooting.

A feature of the invention is provided by the included display panel with turn rate and heading indicators and with a movable element with a part readable on the scale or compass card of the heading indicator and a part readable with relation to the parts of the turn indicator.

Other objects, features and structural details of the invention will be apparent from the following description with relation to the accompanying drawing showing a schematic diagram of the related components of our improved turn control system.

The improved turn control system shown has particular utility in response to helm commands to maneuver a craft such as a submarine or surface marine craft by direction of its rudder from one heading to another heading. Orders to the system from the helm represent turn rate rather than rudder angle as utilized in conventional steering systems. The orders given the rudder in the improved system bring the craft quickly, accurately and smoothly to an ordered turn rate and maneuver the craft in the turn to its ordered heading without overshooting.

As shown, the craft component utilized in the system is provided by a rudder 10 that is driven by servo means operable to change the heading of the craft. The servo means shown includes a heading output servo 11 and a steering engine 12 connected to the rudder 10 through suitable gears and shafting. Servo 11 further includes a mixer 13 for combining the control outputs of the system whose output lead 14 is connected to a motor 15 by way of amplifier 16 and lead 17. The output shaft 18 of motor 15 drives the rotor of a suitable transmitter or synchro 19 that is energized from a suitable source of electrical power indicated at 20. Lead 21 connects the driving synchro 19 to the steering engine 12 to control its operation. Servo 11 further includes a repeatback output for the drive motor 15 in the arrangement shown in the form of an electrical transmitter or synchro 22 whose rotor is positioned in accordance with the motor output shaft 18. As shown, synchro 22 is energized from the power source 20 and is connected as an input to mixer 13 by way of lead 23.

Turn orders for the system are derived from an order transmitter or synchro 24 that is also energized from the power source 20. The means for ordering a turn rate input $\dot{\psi}_0$ to the servo 11 of the system includes synchro 24 that is connected to mixer 13 by way of lead 25 and a manually movable member or helm control stick 26 that is operatively connected to the rotor of the synchro 24 through suitable shaft 27. As shown, the member or stick 26 is pivotably mounted on the instrument panel 28 of the craft and is biased to a null position by a pair of centering springs 29, 30. The output of synchro 24 depends on the movement of the stick or member 26 from its null position by the helmsman in the direction of the arrow designated as a turn to port or in the direction of the arrow designated as a turn to starboard. The movement of the stick 26 is observed by the operating helmsman on a turn rate indicator 31 located on a display panel 32 also located on the instrument panel of the craft. Indicator 31 includes relatively movable scale and pointer parts and in the arrangement shown a movable pointer 33 operatively connected to stick 26 through shaft 34 to connecting shaft 27 is moved with respect to a fixed rate of turn scale 35 to provide a turn rate input $\dot{\psi}_0$ to mixer 13 requiring the craft to turn to port at the indicated rate. In commanding the turn, the movement of the stick or manually movable member 26 under control of the helmsman is read on the turn rate indicator 31 of the display panel 32.

The display panel component 32 of the improved system further includes a heading indicator 36 having relatively movable scale and pointer parts. The scale part of heading indicator 36 shown is a compass card 37 and the pointer part is a fixed index 38. In turns, the card 37 appears to move with relation to the fixed index 38 although the helmsman reading the indicator 36 actually moves with the index 38 around the stabilized card 37 as the craft moves. As read on this indicator, the craft is shown to be on a northerly or zero degree heading.

The directional stabilization required for the card 37 in the type of heading indicator 36 included in the display panel component 32 of the improved system is provided by a suitable directional reference 39 in the form of a gyro compass whose follow-up ring 40 is positioned by an azimuth drive motor 41. As shown, the card 37 of the indicator 36 is slaved to the shaft 42 of the motor 41 by way of the rotor of a compass synchro 44 energized from power source 20. The synchro 44 in the arrangement shown is connected to the receiving synchro 45 by way of lead 46 and the rotor of the synchro 45 is connected to the card 37 by means of shaft 47. The card 37 is accordingly directionally stabilized by the reference 39 so that it remains fixed with respect to the index or pointer 38 as this element of the heading indicator moves with the helmsman with respect to the card 37 as the craft yaws or turns from one heading to another.

As further shown in the drawing, the display panel 32 of the improved system also includes an ordered heading indicator 48 in the form of a three digit counter with representative directional indicia corresponding to the indicia included on the scale 37 of the heading indicator 36. A heading setter crank 49 connected to indicator 48 by shaft 50 is operated by the helmsman to indicate the heading ordered for the craft at the completion of the turn. The heading to which the helmsman has been ordered to bring the craft is set in before the stick 26 is moved. As shown in FIG. 1, the heading ordered for the craft at the completion of this described turn is 336 degrees as represented on the ordered heading indicator 48 on the display panel 32.

In the operation of the improved system, the output $\dot{\psi}_0$ of the craft's turn rate order means from synchro 24 is opposed at the mixer 13 by a means providing an output depending on the actual turn rate of the craft. Initial movement of the stick 26 in the direction of the port arrow in the drawing with corresponding movement of the rate indicator pointer 33 to port results in an ordered output $\dot{\psi}_0$ from the synchro 24 to operate the servo means 11 to move the rudder 10 and start the illustrative maneuver herein described. As the craft starts to turn, the actual turn rate output means provides an output $\dot{\psi}$ that opposes the order rate output $\dot{\psi}_0$. As shown in FIG. 1, the opposing output means includes a turn rate servo or computer 51 with a follow-up motor 52 driven by the output of a data transmission system including the compass synchro 44 and a repeater synchro 54 connected to synchro 44 by lead 53. The motor 52 receives the output of the repeater synchro 54 by way of lead 56, amplifier 57 and lead 58 and drives the rotor of the noted synchro to null through the connecting shaft 59. Motor 52 is accordingly operated at a rate that is dependent on the actual rate that the craft is moving about its yaw axis. As shown, the motor 52 also drives a generator 60 by way of shaft 61, the generator including an exciting winding energized from source 20 and an output winding connected to the mixer 13 by way of lead 73, dividing means $\dot{\psi}/V$ indicated at 72, and lead 78 to lead 62. To maintain sufficient rudder to get the craft into the turn without requiring rudder limits, the output $\dot{\psi}_0$ included in the system by the helmsman is initially greater than the combined outputs of the rate generator 60 and the repeatback synchro 22. As the turn proceeds, the craft's turn rate $\dot{\psi}$ increases with relation to the fixed output order $\dot{\psi}_0$ so that less and less rudder is required and the output of repeatback slowly approaches null with the rudder streamlined. After the stick input $\dot{\psi}_0$ is removed from the system as hereafter described, the rudder reverses direction under control of the output $\dot{\psi}$ only to slow the turn rate of the craft to null as the ordered heading of the craft is reached. Here as the turn rate $\dot{\psi}$ decreases, the output of the repeatback synchro 22 also decreases so that when the craft arrives at the heading ordered the rudder is also positioned in a streamlined condition.

To enable the helmsman to compare the ordered and actual turn rate inputs to the servo means 11, the display panel 32 further includes an element 65 with a pointer part 66 readable on the turn rate indicator 31. As shown, element 65 is a vertical arm that is supported by an actuating piece 67 of a turn rate meter 68 to move across the face of the panel 32 in the directions indicated by the horizontal arrows 69, 70. With no input to the meter 68, the piece 67 is biased so that the element 65 and pointer part 66 assume respective vertical positions at the center of the panel where the pointer part 66 is at the zero scale reading of the turn rate indicator 41. As the system operates and an input commanding a turn to port is fed to the meter 68, the pointer part 66 of the panel indicator moves in the direction indicated by the arrow 70 following the movement to the pointer 33 of the turn indicator 31 under control of the helmsman. This enables the helmsman to compare the relative positions of the respective pointer parts 33 and 66 with respect to the scale 35 of the turn rate indicator 31.

The movable element 65 of the display panel also includes a second pointer part 71 that is read on the scale 37 of the heading indicator 48 by the helmsman to indicate the ordered heading on the heading indicator of the panel. As indicated, this corresponds to the heading 336 degrees shown by the set indicator 48. The null position of the pointer 71 corresponds to the index or lubber line 38 of the heading indicator 48. In the described port turn, the pointer parts 66 and 71 of the movable element 65 move together, the first with respect to the scale 35 and pointer 33 of the rate indicator 31, and the second with respect to the fixed index 38 and scale or compass card 37 of the heading indicator. The system functions so that when the actual turn rate of the craft as read on the panel corresponds to the ordered turn rate and the pointer 71 of the panel indicator indicates the ordered heading 336 on the compass card or scale 37 of indicator 36 as shown, the pull-out point or time in the maneuver is indicated to the helmsman. The helmsman then returns the control stick to its null or centered position. In the described maneuver, this operation by the helmsman occurs as the craft turns through a zero azimuth reading on the compass scale of the heading indicator 36. This nulls the input to the servo means 11 of the system from the output synchro 24 directly controlled by the helmsman. The turn proceeds with inputs to the servo means 11 from the turn rate servo 51 by way of lead 62 and from the repeatback synchro 22 by way of lead 23 until the ordered craft heading is reached without overshooting with the rudder in a streamline condition. As indicated in the panel 32 with relation to the ordered heading indicator 48, an angular difference or error between the related pointers 38 and 71 with respect to the scale 37 indicates the point in the turn at which it is necessary for the helmsman to null the order input to the rudder. The movement of panel element 65 is dependent on the rate that the craft is actually turning divided by its actual speed. As shown in this regard, meter 68 is connected by lead 78 to the dividing means 72 which is connected by lead 73 to the output winding of generator 60. The speed V input to the dividing means 72 is provided by a suitable craft speed computer 74 connected to the rotor of a transmitting synchro 75 by shaft 76. Lead 77 connects the output of synchro 75 to the dividing means 72. The output of the dividing means as a ratio of crafts turn rate and speed ($\dot{\psi}/V$) is fed the meter 68 at the display panel 32 of the system by way of lead 78. The noted ratio is equivalent to the reciprocal of the turning radius of the craft and is approximately equal to the actual turn rate divided by the maximum turn rate obtainable for a particular craft speed.

In the improved system heading changes up to 180° turns can be executed at a desired turn rate under control of the helmsman. The initial movement of the stick or member 26 to locate pointer 33 to either starboard or port of the zero of the scale of the turn indicator as desired and the return movement of the stick or member at the pull-out point observed on the display panel 32 controls the operation of the system to bring the craft to an ordered heading smoothly and without overshooting.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A turn control system for navigable craft including servo means operable to change the heading of the craft having a synchro with a repeatback output; a display panel having a turn rate indicator with relatively movable scale and pointer parts, a heading indicator having relatively movable scale and pointer parts, and a movable element with a part readable on the turn rate indicator and a part readable on the heading indicator; means for ordering a turn rate input to said servo means including a manually movable member operatively connected to the movable part of the turn rate indicator, and a synchro operatively connected to the member providing an output depending on the movement of the member from a null position; means for providing an output depending on the actual turn rate of the craft operatively connected to the servo means in opposing relation to the turn order input means; and means responsive to the actual turn rate output means operatively connected to the movable element of the display panel to move the part thereof readable on the turn indicator to compare actual and ordered craft turn rates and move the part thereof readable on the heading indicator to indicate the ordered heading on the panel.

2. A turn control system as claimed in claim 1, including means operatively connected to the actual turn rate output means for adjusting the system in accordance with the speed of the craft.

3. A turn control system as claimed in claim 1, including means for providing an output in accordance with the speed of the craft, and the means for moving the two part element of said display panel includes means for dividing the rate output of the actual turn rate output means by the speed output of the speed output means.

4. A system for steering navigable marine craft with a rudder including servo means operatively connected to the rudder having a synchro with a repeatback output; a display panel having a turn rate indicator with fixed scale and movable pointer parts, a heading indicator having relatively movable scale and pointer parts, and a movable element with a part readable on the scale of the turn rate indicator and a part readable on the scale of the heading indicator; means for ordering the craft to turn including a helm control stick connected to the pointer part of the turn rate indicator, and a synchro connected to the stick providing an output for said servo means depending on the movement of the stick from a null position; means for providing an output depending on the actual turn rate of the craft operatively connected to the servo means in opposing relation to the output of the turn order synchro; and means for moving said two part panel element depending on the output of the actual turn rate output means to compare the actual and ordered turn rates on the scale of the turn rate indicator and to indicate the ordered heading on the scale of the heading indicator of the panel.

5. A steering system as claimed in claim 4, including means for providing an output in accordance with the speed of the craft, and means for operatively connecting said speed output means to the servo means and the means for moving the two part element of the display panel.

6. A steering system as claimed in claim 5, in which the means operatively connecting the rate output means and the two part element of the display panel includes means for dividing the output of the rate output means by the speed output of the speed output means.

7. In a turn control system for navigable craft having servo means operable to change the heading of the craft; a display panel having a turn rate indicator with relatively movable scale and pointer parts, a heading indicator having relatively movable scale and pointer parts, and a movable element with a part readable on the turn rate indicator and a part readable on the heading indicator; means for ordering a turn rate input to said servo means including a manually movable member connected to the movable part of the turn rate indicator, and a synchro connected to the member providing an output depending on the movemtnt of the member from a null position; means for providing an output in accordance with the turn rate of the craft, means operatively connecting said turn rate output means to the servo means, and means operatively connecting the two part element of the display panel to the turn rate output means.

8. A turn control system as claimed in claim 7, including means providing an input to the means operatively connecting the two part display element and the turn rate output means in accordance with the speed of the craft.

9. A turn control system as claimed in claim 7, including means providing an input to the means operatively connecting the rate output means to the servo means in accordance with the speed of the craft.

10. In a system for steering navigable marine craft with a rudder having servo means operatively connected to the rudder; a display panel having a turn rate indicator with fixed scale and movable pointer parts, a heading indicator with relatively movable compass card and pointer parts, and a movable element with a part readable on the scale of the turn rate indicator and part readable on the compass card of the heading indicator; means for ordering the craft to turn including a helm control stick connected to the movable part of the turn rate indicator, and a synchro connected to the stick providing an output for said servo means depending on the movement of the stick from a null position; and means providing an output depending on the actual turn rate of the craft operatively connected to the two part movable element of the display panel and operatively connected to the servo means in opposition to the output of the turn order synchro.

11. In a system for steering navigable craft; a display panel including a turn rate indicator with fixed scale and movable pointer parts, a heading indicator with relatively movable scale and pointer parts, and a movable element with a part readable on the scale of the heading indicator and a part readable on the fixed scale of the turn indicator; a manually movable member connected to the movable part of the turn rate indicator, and means for providing an output in accordance with the actual turn rate of the shaft operatively connected to the movable two part element of the display panel.

12. A steering system as claimed in claim 11, including means providing an output in accordance with the speed of the craft, and means for operating said two part element in accordance with the output of said speed output means.

13. In a system for steering navigable craft; a display panel including a heading indicator having a movable compass card and a fixed pointer, and a movable element with a pointer readable on the compass card of the heading indicator; and means for providing an output in accordance with the turn rate and speed of the craft operatively connected to the movable element of the display panel.

14. In a system for steering navigable craft; a manually movable turn order member, a synchro having a rotor operatively connected to the order member providing an output depending on an ordered turn rate; a display panel including a turn rate indicator having a movable element operatively connected to the order member, a heading indicator having a movable element, and a movable double pointer part one of whose pointers is readable on the turn rate indicator and the other of whose pointers is readable on the heading indicator; means for providing an output depending on the actual turn rate and speed of the craft, means for moving the double pointer part of the display panel in accordance with the output of said turn rate and speed output means, and servo means responsive to the outputs of said synchro and turn rate and speed output means operable to change the heading of the craft.

15. A system as claimed in claim 14, in which the turn rate indicator includes a fixed scale and the one pointer of the double pointer part moves with respect to the scale, the movable element of the heading indicator is a compass card, and the other pointer of the double pointer part moves with respect to the compass card.

16. In a system for steering navigable craft; a display panel including a turn rate indicator having a movable element, a heading indicator having a movable element, and a movable double pointer part one of whose pointers is readable on the turn rate indicator and the other of whose pointers is readable on the heading indicator; a manually movable turn order member operatively connected to the movable element of the turn rate indicator, and means for moving the double pointer part of the display panel in accordance with the actual turn rate and speed of the craft.

References Cited in the file of this patent

UNITED STATES PATENTS

| | | |
|---|---|---|
| 1,612,434 | Henderson | Dec. 28, 1926 |
| 2,292,451 | Koster | Aug. 11, 1942 |